April 4, 1950     G. C. FRICKE ET AL     2,503,036
CARBURETOR
Filed Nov. 8, 1946
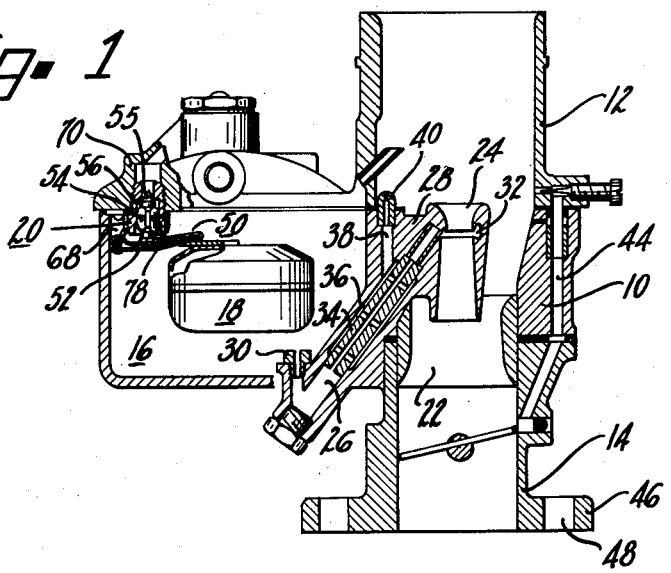
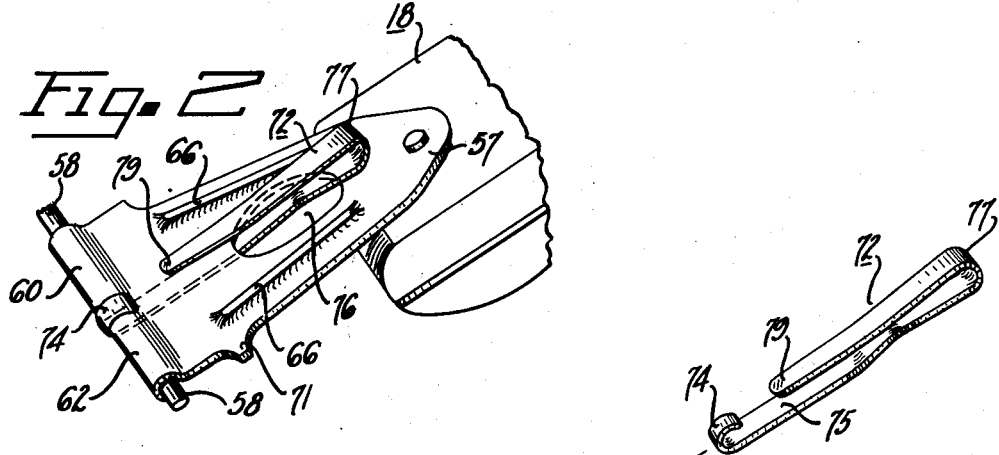
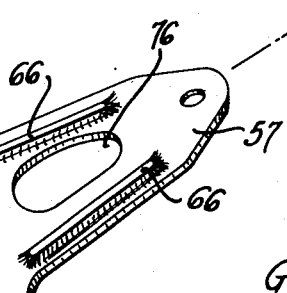
INVENTORS
GUY C. FRICKE
ROBERT W. SLOANE
BY M. A. Hobbs
ATTORNEY Patented Apr. 4, 1950

2,503,036

UNITED STATES PATENT OFFICE 2,503,036

CARBURETOR

Guy C. Fricke, Pleasantridge, and Robert W. Sloane, Detroit, Mich., assignors to Bendix Aviation Corporation, South Bend, Ind., a corporation of Delaware Application November 8, 1946, Serial No. 708,642

4 Claims. (Cl. 137—104)

1

The present invention relates to float type carburetors for internal combustion engines and the like and more particularly to a fuel float and inlet valve construction for the aforesaid carburetors.

It is known that in conventional float type carburetors, engine vibration and road jarring transmitted through the vehicle to the carburetor may cause the float to oscillate vertically even though the fuel is at a level normally sufficient to maintain the float at its uppermost position and the fuel valve closed. Inasmuch as the conventional carburetors are generally provided with a rigid float lever and valve engaging arm, as well as a nonyieldable valve construction, any oscillation of the float when the fuel in the bowl is at full level causes successive momentary openings of the fuel valve and a consequent flow of fuel into the bowl. When the engine is consuming fuel at a low rate, as at idling or slow speed, the opening of the fuel valve under the influence of the engine vibration or road jarring permits fuel to enter the fuel bowl at a greater rate than it is being consumed, thus causing excess fuel to spill from the discharge jet into the induction passage or to overflow the fuel bowl. It is therefore one of the principal objects of the present invention to provide, in a float type carburetor for an internal combustion engine, a fuel valve control mechanism which is unaffected in its operation by engine vibration or road jarring transmitted to said carburetor.

Another object of the present invention is to provide, in a float type carburetor for an internal combustion engine, a linkage between the float and the fuel inlet valve which will not transmit engine vibration or road jarring from the float to the fuel inlet valve.

Another object is to provide in a carburetor a resilient linkage between a float and a valve which is capable of maintaining the valve in its closed position irrespective of vibration transmitted to said float.

Still another object of the invention is to provide a valve control mechanism for a carburetor which is unaffected in its operation by vibration of the carburetor.

A further object is to provide a compound float lever for controlling a fuel inlet valve, which can be readily assembled in operating position in a carburetor and thereafter easily serviced and the parts thereof readily replaced in the field.

Additional objects and advantages of the present invention will appear from the following description and accompanying drawings wherein a

2 specific embodiment of our invention is disclosed. The linkage between the float and valve is not limited to the particular embodiment disclosed herein nor to a linkage in a carburetor for an internal combustion engine, but is understood to be available in many carburetor constructions in which a float for controlling a valve is subjected to extraneous vibrations and jarring adversely affecting control of the valve by said float.

Figure 1 is a vertical cross section of a conventional carburetor showing several of the principal features thereof in conjunction with the present invention.

Figure 2 is an isometric view of the linkage between the fuel float and fuel valve showing the parts thereof in their assembled positions, together with a portion of the float.

Figure 3 is an isometric view of a float lever forming an element in the linkage shown in Figure 2.

Figure 4 is an isometric view of the valve engaging arm of the linkage shown in Figure 2.

The present invention may be readily understood by referring to the drawings in which Figure 1 illustrates a conventional downdraft single barrel carburetor for an internal combustion engine, wherein numeral 10 designates a main body, 12 an air horn, 14 a throttle body and 16 a fuel bowl or float chamber having a float 18 and fuel inlet generally shown at 20 mounted therein. The main body 10 is secured at the air inlet end thereof to air horn 12 and at the air outlet end to throttle body 14 and contains a large venturi 22, small venturi 24 concentrically located in respect to said large venturi and a fuel discharge jet 26 connecting fuel bowl 16 with the throat of the small venturi. The small venturi 24 is held in place by fin 28 which is preferably integrally connected to the said venturi and to the side wall of main body 10. The main discharge jet which is inclined upwardly from a point adjacent the bottom of the fuel bowl delivers fuel supplied by a main metering orifice 30 to an annular discharge orifice 32 in the throat of the small venturi and is provided with a perforated sleeve 34 which forms a cylindrical well 36 around said jet in the center portion thereof. An air bleed duct 38 and vapor dome 40 are provided in combination with the fuel discharge nozzle, and as shown in the drawings, air bleed duct 38 connects said vapor dome with well 36.

The accelerating pump and power enrichment jet usually included in conventional carburetors are not shown in the drawings and the idle system is only partially shown, said system being designated in the drawings by numeral 44. While these elements are not described herein, it is understood that they form a part of the carburetor in which the present invention is illustrated. For securing the carburetor to the intake manifold (not shown), an external flange 46 and holes 48 for suitable bolts are provided at the mixture discharge end of the throttle body.

The flow of fuel through inlet 20 into float chamber 16 is controlled by float 18 through linkage 50 in accordance with the quantity of fuel in said chamber, said linkage including a compound lever 52, pivoted at one end, for supporting float 18, in combination with a fuel valve stem 54 adapted to abut against and to be actuated by said compound leved. A fuel valve 55 which is directly controlled by stem 54 regulates the flow of fuel through orifice 56 and is preferably joined integrally with said stem. The float 18 is mounted on a rigid hinge 57 of compound lever 52 and is secured thereto preferably by brazing or soldering, although any other suitable joining means may be used. Hinge 57 is mounted on pin 58 and rotatably secured thereto by rolled portions 60 and 62 formed in the margin of the lever on the end opposite the float, said rolled portions being formed in spaced relation to one another to provide slot 64 between the two portions. A longitudinal stiffening rib 66 is provided along each side of hinge 57 to give rigidity to said hinge between float 18 and pin 58. Pin 58 on which hinge 57 is mounted is secured in place adjacent fuel inlet 20 by a bifurcated bracket 68 depending from the top 70 of the float chamber.

A resilient U-shaped lever or hairpin spring 72 operates in conjunction with hinge 57 and is provided with a rolled portion 74 at the end of prong 75 to form an eye for rotatably mounting said lever on pin 58 in slot 64. In the assembled position said prong extends from pin 58 along the lower side of hinge 57 through hole 76 to the top side of said hinge, and the portion of said prong 75 adjacent the U-shaped bend 77 normally rests on the top side of hinge 57 directly above float 18.

Valve stem 54 is slidably received in sleeve 78 and rests on prong 79 of lever 72 which is so positioned in respect to inlet 20 that any oscillating movement of said hinge when the fuel bowl is below full level causes stem 54 and valve 55 to reciprocate in sleeve 78 and to open and close inlet orifice 56. In the arrangement and construction shown in the drawings, prong 79 of the resilient lever 72 will be pressed downwardly toward hinge 57 when the fuel is at full level in bowl 16 and the float is in its uppermost position, yieldably holding valve 55 in its closed position. Some of the force to which prong 79 is subjected is transmitted through the U-shaped bend to prong 75 between rolled portion 74 and the point at which prong 75 contacts the top surface of hinge 57, thus giving greater resiliency to lever 72 and making it more effective in dampening the vibration transmitted to the carburetor float.

During the operation of the engine when the fuel in the fuel bowl is appreciably below full level, vibration of the carburetor and the oscillation of the float resulting therefrom have no significant effect on the control of the fuel by the float, but as the quantity of the fuel required by the engine diminishes and the fuel in the bowl approaches full level, any vibration or oscillation causing the valve to open and admit excess fuel raises hinge 57 and lever 72 and increases the force of lever 72 urging valve 55 to its closed position. When the fuel reaches normal full level, any oscillation of the float and the compound lever 52 resulting from engine vibration or road jarring is confined within the limits of deflection of resilient lever 72. Thus, valve 55 is held in its closed position until the level of the fuel decreases to a point where resilient lever 72 is no longer depressed appreciably by contact with valve stem 54.

In the procedure of assembling the parts of the present compound float lever, the float 18 is secured by soldering or brazing to the free end of hinge 57, and then prong 75 is slipped through hole 76 to a position such that rolled portion 74 aligns in slot 64 with rolled portions 60 and 62 of hinge 57. While lever 72 is held in this position, pin 58 is slipped axially through said rolled portions and the ends of the pin are secured in place in the bifurcated bracket 68 adjacent inlet 20. With the lever 72 in this position, prong 79 engages the lower end of valve stem 54 and retains said stem in operative position in sleeve 78. A laterally projecting lug 71 cooperates with a lug (not shown) on bracket 68 to prevent said hinge from dropping down so low that valve stem 54 will become dislodged from sleeve 78. It is apparent that the present construction may be easily serviced in the field, and lever 72 which is subjected to incessant vibration during the operation of the engine and consequently may break, may be readily replaced with the removal of a minimum number of parts from the carburetor.

The rolled portion 74 of lever 72 may be only partially closed so that said lever can be assembled after the pin 58 has been inserted in rolled portions 60 and 62 by merely slipping prong 75 through hole 76 of hinge 57 and then clipping the rolled portion over said pin in slot 64. This modification facilitates the servicing of the assembly and the replacing of lever 72 in the field without the necessity of removing pin 58 from bracket 68 or hinge 57.

Since the resilient lever 72 is not bonded in any manner to the other parts comprising the linkage between the float and fuel inlet valve, it can be constructed of any material having suitable resiliency. Further, after said lever has been formed and properly tempered, it is not subjected to any heat, such as that of a joining operation, which might draw the temper from lever 72 or distort either said lever or hinge 57.

Although only one specific arrangement of the present fuel inlet control mechanism has been given herein, it will be understood that variations therein may be made without departing from the scope of the invention as defined in the appended claims.

We claim:

1. A compound lever for a fuel float comprising a comparatively rigid hinge adapted to be pivoted at one end and to receive a float at the other end, said hinge having a centrally located hole therethrough, and a resilient hairpin lever one prong of which being adapted to extend through said hole and to be pivoted at a point in common with the pivot of said hinge and the other prong of which being adapted to engage a control member of a fuel inlet valve.

2. A compound float lever for minimizing the effect of vibration on the control of fuel by a float comprising a rigid hinge adapted to be pivoted at one end and to receive a float at the other end, said hinge having a hole therethrough, and a resilient hairpin lever one prong of which being adapted to extend through said hole and to be pivoted at a point in common with the pivot of said hinge and the other prong of which being adapted to engage a control member of a fuel inlet valve.

3. In a carburetor float assembly adapted to minimize the effect of vibration on the control of fuel by a float, the combination comprising a hinge having one end adapted to receive a float and having a means on the opposite end for pivoting said hinge, said hinge having a centrally located hole, a pin for said means, and a resilient hairpin lever having one prong extended through said hole and pivoted on said pin and the other prong being adapted to engage a control member of a fuel inlet valve.

4. A compound float lever for minimizing the effect of vibration on a fluid control valve by a float, comprising a hinge adapted to be pivoted at one end and to receive a float at the other end, said hinge having a hole therein spaced from the pivoted end, and a resilient lever turned upon itself extending through said hole and adapted to be pivoted adjacent the pivoted end of said hinge and to engage an actuating member of the control valve.

GUY C. FRICKE.
ROBERT W. SLOANE.

REFERENCES CITED

The following references are of record in the file of this patent:

UNITED STATES PATENTS

| Number | Name | Date |
|---|---|---|
| 1,225,076 | Taber | May 8, 1917 |
| 1,598,948 | Watt | Sept. 7, 1926 |
| 1,840,727 | Linkert | Jan. 12, 1932 |
| 1,882,725 | Asire | Oct. 18, 1932 |
| 2,038,223 | Kittler | Apr. 21, 1936 |
| 2,130,847 | Kersgieter | Sept. 20, 1938 |
| 2,172,935 | Ewart | Sept. 12, 1939 |
| 2,281,126 | Willits | Apr. 28, 1942 |